July 23, 1957
W. H. GOODWIN ET AL
2,800,345
JOINT FOR ARTIFICIAL LIMBS
Filed June 14, 1954
3 Sheets-Sheet 1
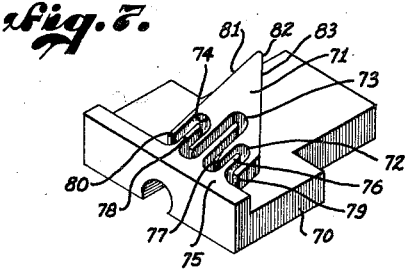
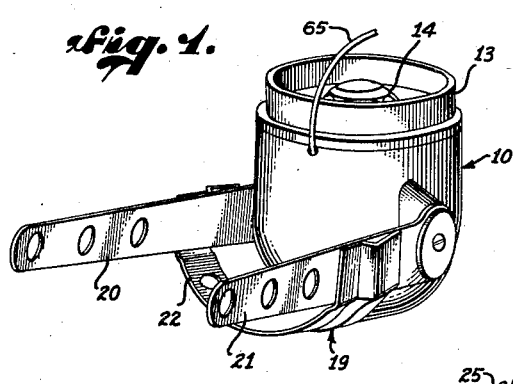
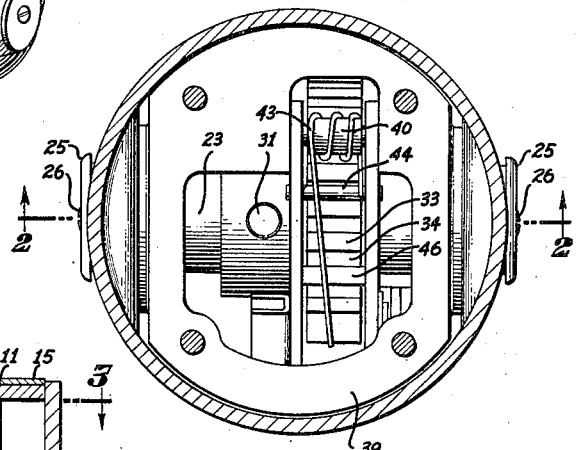
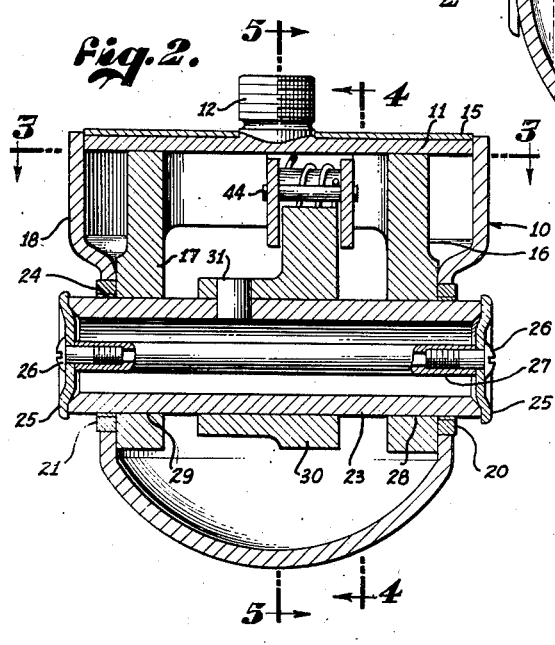
WALTER H. GOODWIN &
BOB A. KINDRED,
INVENTORS.
HUEBNER, BEEHLER,
WORREL & HERZIG,
ATTORNEYS.

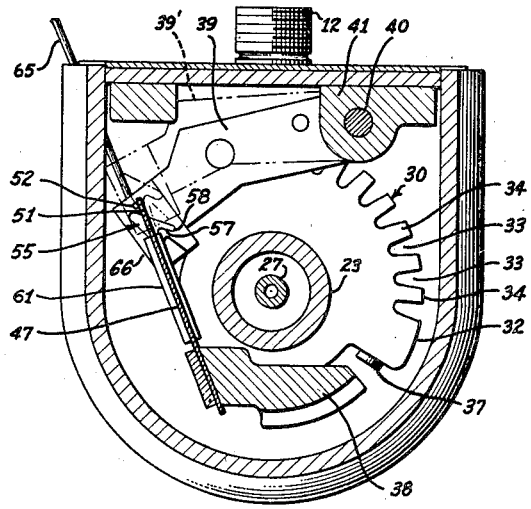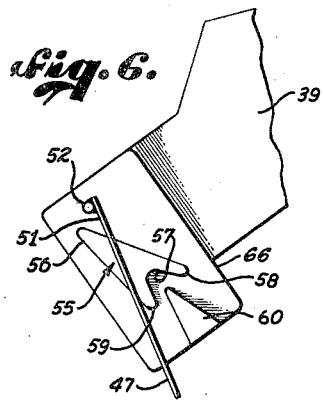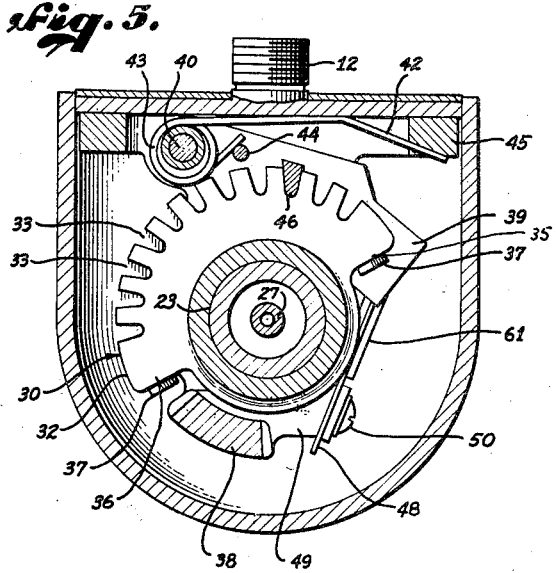

July 23, 1957 W. H. GOODWIN ET AL 2,800,345
JOINT FOR ARTIFICIAL LIMBS
Filed June 14, 1954 3 Sheets-Sheet 3

WALTER H. GOODWIN &
BOB A. KINDRED,
INVENTORS.

HUEBNER, BEEHLER,
WORREL & HERZIG,
ATTORNEYS.

United States Patent Office 2,800,345
Patented July 23, 1957

2,800,345

JOINT FOR ARTIFICIAL LIMBS

Walter H. Goodwin, Sierra Madre, and Bob A. Kindred, Duarte, Calif., assignors to Sierra Engineering Co., Sierra Madre, Calif., a corporation of California Application June 14, 1954, Serial No. 436,284

5 Claims. (Cl. 287—14)

The application relates to prosthetics and has particular reference to a joint by means of which an artificial limb is attached to a portion of a limb on a human body and in particular an arm joint.

Developments in recent years have proven that by use of mechanically actuated hooks persons deprived of a portion of an arm can be assisted to a very exceptional degree in performing a great variety of tasks. The mechanical aids have been such as to make use of whatever portion may remain of the natural arm. To make such use of the natural arm there must be provided a substitute joint, either intermediate the ends of the artificial limb, or adjacent one end where the artificial limb is attached to the stub of the natural limb. Heretofore joints which have been resorted to have been located indiscriminately with respect to the natural jointing location of the arm with the result that the artificial arm has been awkward to use and sufficiently unnatural in its permitted motion to attract unnecessary attention to the necessity for use of such a mechanical aid. Moreover, prior devices have been complicated in structure, have not been sufficiently easy to adjust, and have in general been such as to fail in giving proper encouragement to persons forced to rely upon such mechanical aids.

It is therefore among the objects of the invention to provide a new and improved joint for an artificial limb which is particularly easy to operate and to be moved to any one of a considerable number of desired positions.

Another object of the invention is to provide a new and improved joint for an artificial limb which is compact in its structure and also relatively light in weight to the end that the joint may be worn by the user with a considerable degree of comfort.

Still another object of the invention is to provide a new and improved joint for an artificial limb which includes an alternator mechanism adapted to operate on a relatively short throw so that the artificial limb can be quickly and readily moved to a desired position and there immediately fixed for manipulation in the desired position.

Still further among the objects of the invention is to provide a new and improved joint for an artificial limb which incorporates an alternator mechanism adapted to alternately release the arm for movement to a new position and thereafter temporarily locking it in that position, the alternator mechanism being so constructed that it is compact, pliant, and capable of manipulation with a relatively minimum amount of force in the adjusting portions of the mechanism.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a perspective view of a modified form of the invention.

Figure 2 is a longitudinal sectional view of the modified form taken on the line 2—2 of Figure 3.

Figure 3 is a cross-sectional view of the modified form taken on the line 3—3 of Figure 2.

Figure 4 is a longitudinal sectional view of the modified form at right angles to the view of Figure 2 and taken on the line 4—4 of Figure 2.

Figure 5 is a longitudinal sectional view at right angles to the view of Figure 2 looking in the opposite direction from Figure 4 and taken on the line 5—5 of Figure 2.

Figure 6 is a fragmentary elevational view of the alternator portion of the mechanism in the modified form.

Figure 7 is a perspective somewhat schematic view showing a form of the alternator portion of the mechanism wherein three distinct positions can be achieved.

Figure 8:
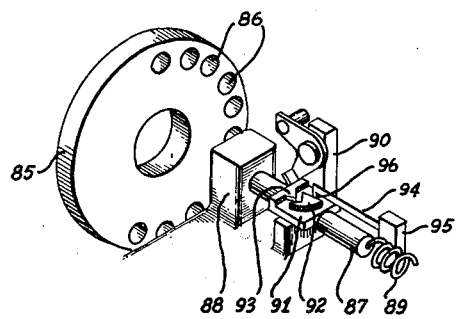
Figures 8, 9 and 10 are schematic representations of the alternator mechanism for the device wherein moving parts are positioned in various different relative directions.

In the form of the invention choosen for the purpose of illustration a prosthetic elbow joint is shown adapted especially to an amputation in the upper arm at some distance above the elbow. In this form a relatively stationary member is indicated generally by the reference character 10. This is that portion adapted to be fastened to the body of the user. For that purpose a flat plate 11 has a threaded base 12 centrally mounted thereon for securement to a jacket 13 attached by some convenient means, not shown, to the arm stub of the user by means of a nut 14. A washer 15 may be provided at the connection to provide a resistance to rotation.

The plate 11 which may be considered as a platform serves as a means for mounting thereon a pair of spaced parallel plates 16 and 17, the plates and platform preferably constituting a single integral piece. A jacket 18 is provided to serve as a finishing cover for the stationary member. For attachment to the movable artificial member there is provided a relatively movable joint member indicated generally by the reference character 19. The movable joint member is here illustrated as comprising longitudinal extensions 20 and 21 joined by a band 22, both portions being provided with suitable apertures for attachment to the appropriate artificial limb. The extensions 20 and 21 are attached to a pivot tube or hollow shaft 23, the extensions being non-rotatably fixed relative to the shaft by means of splines 24. Washers 25 may be provided over the exterior ends of the shaft anchored to each other by means of screws 26 extending into a tube 27. The shaft 23 is so constructed that it pivots freely within appropriate bearing apertures 28 and 29, respectively, in the plates 16 and 17.

Intermediate the plates 16 and 17 and non-rotatably mounted on the shaft 23 is a positioning segment 30. The segment is non-rotatably secured to the shaft by means of a dowel pin 31. The positioning segment has an arcuate perimeter 32 in which is a series of spaced notches 33 separated by sections 34, the outer ends of the sections lying in the plane of the arcuate perimeter. Shoulders 35 and 36 on opposite ends of the arcuate perimeter are provided with suitable pads 37 adapted for abutment against a stop block 38, thereby to limit rotation of the movable member 19 relative to the stationary member 10. The stop block is secured to and forms a part of the stationary member 10.

A catch is provided on the stationary member 10 for engagement with the movable member 19 in order to anchor it in any one of its various positions of adjustment. The catch comprises in part a lever 39 pivotally mounted by means of a pin 40 to a bracket 41. The lever is therefore permitted a limited rotation about the pin 40. The lever is normally urged in a direction counterclockwise, as viewed in Figure 4, and clockwise, as viewed in Figure 5, by means of a spring 42, one end 43 of which is wound loosely around the pin 40 and brought into abutment against a pin 44 on the lever. The other end of the spring presses upwardly against a portion 45 of the stationary member 10.

The lever 39 in the form here shown comprises parallel side elements overlying opposite faces of the positioning segment and includes a locking block 46 extending between the sides in a position adapted to fall into one or another of the notches 33. The locking block is preferably tapered with a taper corresponding to that of the notches so as to fit snugly and neatly into the notches without binding. The lever is designed to be held in one of two positions, namely, a position such as that illustrated in Figure 5 wherein the locking block is engaged in one of the notches 33 and a position withdrawn therefrom, permitting the movable member 19 to pivot freely with respect to the stationary member 10. For holding the lever in either one of these two positions there is provided a leaf spring 47, one end 48 of which is anchored on a portion 49 of the stop block 38 by means of a pad and screw 50. A free end 51 of the spring has a hook in the form of a pin 52 attached thereon, the pin being adapted to extend beyond the edge of the spring into positions of engagement with a cam 55. The cam 55 has a tapered end 56 facing obliquely upwardly, as viewed in Figure 4, at one side of the pin 52. On the face of the cam opposite from the tapered end 56 is a recess 57 located between round ends 58 and 59. A guide 60 fastened upon one side of the lever 39 as is also the cam has a tapered end extending into the recess 57 providing thereby a guide-way or track within which the pin 52 is confined when it enters and leaves the recess 57. A damping pad 61 is secured to and extends throughout a substantial portion of the length of the spring 47 in order to minimize vibration of the spring during operation and resultant noises which might be disconcerting to the user.

For manipulating the mechanism thus described, there is provided a cable 65 adapted to be attached to a conventional shoulder harness, not shown. The cable 65 is appropriately fastened to the lever 39 near its free end thereby to provide a means for moving the lever against tension of the spring 42.

In operation when the parts have the positions illustrated in Figures 4 and 5 the locking block 46 is in engagement with one of the notches 33 of the positioning segment. The movable member 19 is thus fixed in angular position with respect to the stationary member 10. When it is the desire of the user to change that angular position, the cable 65 is pulled on moving the lever in a direction clockwise, as viewed in Figure 4, to the broken line position 39' there shown. While that movement is taking place, the pin 52 slides down the adjacent face of the cam moving toward the right, as viewed in Figure 4, until it passes the rounded end 58, at which point the pin will be sprung back by spring action against the guide 60 preparatory to entrance into the channel or guide-way provided between the recess 57 and the guide 60. The guide and the side of the recess opposite thereto prevent the pin 52 from being sprung past the cam at this point. When the cable 65 is then released, the spring 42 moves the lever 39 a slight distance counter-clockwise, as viewed in Figure 6, until the bottom of the recess 57 is pushed against the pin 52. The relationship of the parts is such that in this position the locking block 46 will be clear of the perimeter 30. Consequently the movable member 19 may be rotated at will by some appropriate conventional attachment, well known in this branch of prosthetics.

When the movable member is moved to the desired position, the member can be anchored there by a succeeding pull upon the cable 65. When the cable is pulled upon at this time, the cam 55 is pulled away from the pin 52 which rides out of the channel adjacent the rounded end 59 and is sprung past the rounded end 59 by tension in the spring so that the pin 52 is in a position adapted to ride against the lower cam face of the cam 55. Then when the cable 65 is released, the pin will ride along the lower cam face until it passes the tapered end 56, after which it will be sprung back to the initial position illustrated in Figures 4 and 6. In that position the lever 39 will have been sprung back against the positioning segment until the locking block 46 enters the appropriate notch 33. Here also should the locking block fall against one of the sections 34 between notches 33, the weight of the forearm will be sufficient to cause the locking block to fall into the next adjacent notch. Should this additional movement be not desirable, the sections 34 may be rounded slightly so that the locking block will automatically enter the nearest adjacent notch.

Where occasions might arise necessitating a plurality of positions of the alternator, a yoke 70 may be provided to take the place of the lever 39. In this instance a cam 71 is provided with three recesses 72, 73 and 74. A guide 75 includes three projections 76, 77, and 78 extending respectively into the recesses 72, 73 and 74 providing a continuous channel into which the pin can enter and through which it is adapted to travel. The pin 52 urged by tension in the spring 47 will tend to seek the recess in order of their numbering after passing a rounded end 79. The pin will finally emerge and be sprung past a rounded end 80 to a position where in the next cycle it will be adapted to ride along a cam-way 81, until it passes a tapered end 82, being sprung back to initial position again by tension in the spring 47. The spring 47 will then again be ready to slide along a cam-way 83 in the next cycle of operation. To cause the pin to move from one recess to the next, the yoke 70 is reciprocated by the same means comparable to the spring 42 already described.

Figure 9:
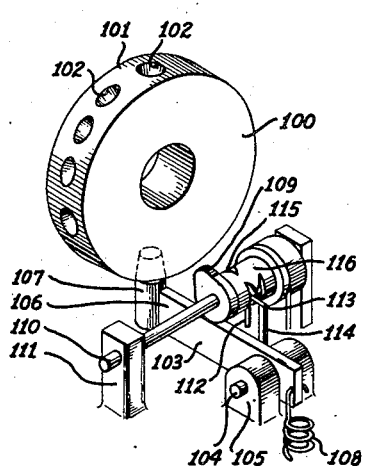
Figure 10:
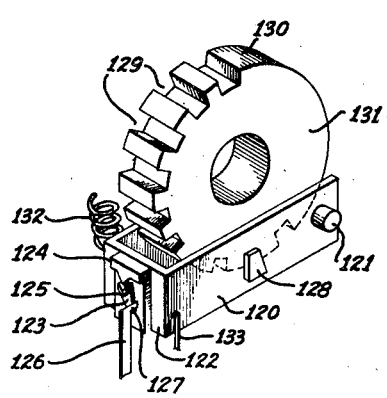

Figures 8, 9 and 10 illustrate adaptations of the mechanism to artificial limbs wherein the application of motion is in a slightly different direction, the illustrations in these figures being essentially schematic.

In Figure 8, by way of example, there is shown an annular disk 85 which serves the same purpose as the positioning segment 30 heretofore described. Holes 86 are spaced about the disk near its periphery. A plunger 87 is adapted to enter any one of the holes 86, the plunger being guided by a relatively stationary guide block 88. A spring 89 tends normally to urge the plunger toward entry into one of the holes 86 in the disk 85. A mounting 90 supports the mid-portion of the plunger at which location is a yoke 91. The yoke is in fact a part of the plunger. Located on the yoke is a cam 92 cooperating with a guide 93 to form a suitable track or channel therebetween. A suitable spring arm 94 anchored on the stationary portion of the device at 95 has a pin 96 at its free end adapted to ride against the cam 92 in the manner already described in connection with cam 55. In this manner when the pin 96 enters the recess adjacent the guide, the plunger will be temporarily retained in a position free from the holes 86. On movement of the plunger from left to right from this position, the pin 96 will leave the track or channel and the plunger is then free to be urged by the spring 89 into a selected one of the holes 86 to position the disk 85 at a corresponding position.

In Figure 9 a disk 100 is shown mounted for rotation about its central axis. A relatively wide edge 101 has a series of radially disposed holes 102 therein. A lever 103 is pivotally mounted on a pin 104 in a bracket 105. A movable end 106 of the bracket supports a tapered plunger 107 which is adapted to be pressed into one or another of the holes 102 upon being urged by a spring 108. The lever 103 in this instance is manipulated by means of a power cam 109 fixed on a cam shaft 110 in turn supported by brackets 111.

When it is desired to release the plunger 107 from engagement with the disk 100, pull is exerted on a cable end 112 sufficient to rotate the power cam 109 counter-clockwise until it pushes against the lever 103 far enough to release the plunger 107. At this point a pin 113 on a spring arm 114 enters a recess 115 on a drum 116 and prevents the spring 108 from returning the power cam. A suitable guide restrains lateral action of the spring arm 114 until pull on the cable end 112 is released. When it is desired to reinsert the plunger 107 into one of the holes 102, the cable end 112 is again pulled upon. This will move the recess 115 relative to the pin 113 which will follow a path out of the recess and as the drum 116 is forced to travel a clockwise rotation by pressure of the lever 103 under tension of the spring 108, the drum will return to its initial position and the plunger 107 will enter one of the holes 102.

In Figure 10 there is shown a tiltable yoke 120 adapted to pivot about a pin 121. A crossbar 122 of the yoke carries a cam 123 of the sort heretofore described and a guide 124 adapted to enter an appropriate recess 125 of the cam. A spring arm 126 mounted as previously described has a pin 127 at the free end adapted to follow around the cam 123 and into the recess 125.

In this form of the invention a wedge-shaped positioning bar 128 is carried by the tiltable yoke 120 in a position adapted to enter any one of the wedge-shaped notches 129 in an edge 130 of a disk 131. The disk is mounted so as to be capable of rotation about its central axis. A spring attached to the tiltable yoke may be depended upon to normally urge the yoke in a direction such that the positioning bar 128 is urged toward the area of the notches 129.

To operate the device in this form, pull is exerted upon a cable 133 so as to tilt the tiltable yoke 120 in a generally counter-clockwise direction, as viewed in Figure 10, a distance far enough to withdraw the positioning bar 128 clear of the notch 129 in which it is positioned. This movement pulls the cam 123 downwardly a distance sufficient to let the pin 127 carry over the upper right end of the cam 123 until it strikes against the guide 124. When the cable is released, the pin will fall into the recess 125 and hold the positioning bar out of engagement with the area of the notches 129. When it is desired to have the positioning bar again enter one of the notches 129, the cable 133 is pulled upon until the pin 127 passes out of the recess 125 on the opposite side of the guide 124 from whence it entered, after which when the cable is released the pin 127 will slide along the left edge of the cam 123. Meanwhile, the spring 132 pulls the tiltable yoke again in a clockwise direction until the positioning bar 128 enters one of the notches 129.

In the schematic forms of the invention illustrated in Figures 8, 9 and 10 it will be apparent that motion of a positioning bar or plunger may be at some different direction relative to an actuator disk with which it is adapted to engage; that is to say, the plunger in whatever form may be selected may enter the disk at the flat side, as suggested in Figure 8, or edgewise, as suggested in Figures 9 and 10. Meanwhile, the cam which guides the pin may be either flat or a curved surface, the last instance being the surface of the cam in Figure 10 wherein rotary motion provides the reciprocation of the cam rather than a straight line reciprocating motion. In mechanisms as compact as joints for prosthetic devices it may be advantageous to have the moving parts rotate in different directions, one relative to the other, to the end that resort may be necessary to different combinations of motion of the cam-carrying member and the engaging member which stops and releases rotation of an actuator member.

There has accordingly been described herein a simple and effective artifical joint incorporating an alternator making it a very easy and efficient operation for a person deprived of some portion of his arm to manipulate an artifical mechanical arm for the accomplishment of many acts which the user would otherwise be deprived of.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A joint for incorporation in an artificial limb comprising a relatively stationary member and a relatively movable member pivotally secured to the stationary member, one of said members including an element having an arcuate perimeter and having a series of spaced configurations in said perimeter, the other of said members having a spring actuated plunger assembly reciprocatably mounted thereon including an end adapted to engage in one or another of said configurations dependent upon the relative pivoted positions of said members whereby to anchor said members against pivoting, and a two position catch for said plunger comprising a cam on the plunger having a detaining portion, a spring element on said other member and having a hooked end lying normally on one side of the cam, said hooked end being adapted to follow the perimeter of said cam during two successive reciprocations of the plunger whereby when the hook engages the detaining portion said end of the plunger is in a position withdrawn from a configuration-engaging position and when the hook is released from the detaining portion said end of the plunger is enabled to move into a configuration-engaging position.

2. A joint for incorporation in an artificial limb comprising a relatively stationary member and a relatively movable member pivotally secured to the stationary member, one of said members comprising a plate pivotally mounted thereon and the other of said members having an element retained rotatably adjacent said plate, said element having an arcuate perimeter and having a series of spaced notches in said perimeter, said plate having a spring actuated plunger reciprocatably mounted thereon including a head adapted to engage in one or another of said notches whereby to anchor said members against pivotal movement of one relative to the other, and a two position catch for said plunger comprising a cam on the plunger having a detaining portion, a leaf spring on said one member and having a hooked end lying normally on one side of the cam, said hooked end being adapted to follow the perimeter of said cam during two successive reciprocations of the plunger whereby when the hook engages the detaining portion the head is withdrawn from a notch-engaging position and when the hook is released from the detaining portion the head is enabled to move to a notch-engaging position.

3. A joint for incorporation in an artificial limb comprising a relatively stationary member and a relatively movable member pivotally secured to the stationary member, one of said members comprising spaced parallel plates and the other of said members having an element confined rotatably between said plates, said element having an arcuate perimeter and having a series of spaced notches in said perimeter, said one of said members having a spring actuated plunger reciprocatably mounted thereon including a head adapted to engage in one or another of said notches whereby to anchor said members against pivoting, and a two position catch for said plunger comprising a cam on the plunger having a tapered end, a recessed face opposite said tapered end and a guide within and spaced from the recessed face, a leaf spring on said one member and having a hooked end lying normally on one side of the tapered end, said hooked end being adapted to follow the perimeter of said cam during two successive reciprocations of the plunger whereby when the hook is in the recess the head is withdrawn from a notch-engaging position and when the hook is released from the recess the head is enabled to move to a notch-engaging position, and a cable on said plunger for reciprocation of the plunger.

4. An artificial arm joint comprising a first member adapted for attachment to the stub of a human arm, said member comprising a pair of spaced plates, a second member comprising a shaft and artificial arm-engaging means on the shaft, said second member being pivotally mounted on said first member, a positioning segment fixed on the shaft and having notches spaced in an arcuately extending line, a lever pivotally mounted on the first member and extending to a position overlying said positioning segment, said lever being normally biased toward said segment, a cantilever spring secured at one end to said first member, said spring having a hook at the other end, a cam on the lever having a tapered end and a side on the cam opposite said tapered end having a track for the hook, said cam having one position wherein the hook of the spring lies on one side of the tapered end and another position wherein the hook lies within the track, and a plunger on the lever having a notch-engaging position at said first position of the hook and a position released from notch-engagement when the hook is in said other position.

5. An artificial arm joint comprising a first member adapted for attachment to the stub of a human arm, said member comprising a platform and a pair of spaced parallel plates on said platform, a second member comprising a shaft and artificial arm-engaging means on the shaft, said second member being pivotally mounted about said shaft on said plates, a positioning segment fixed on the shaft and having an arcuate perimeter and notches in said perimeter, a lever pivotally mounted on the first member and extending to a position overlying said positioning segment and a spring normally biasing said lever toward said segment, a leaf spring secured at one end to one of said plates, said spring having a hook at the other end and a vibration absorbing material between the ends of the spring, a cam on the lever having a tapered end facing away from the segment, a side on said cam having a recess facing toward said segment and a guide positioned within and spaced from the recess, said cam having one position wherein the hook of the spring lies on one side of the tapered end and another position wherein the hook lies within the recess, and a plunger on the lever having a notch-engaging position at said first position of the hook and a position released from notch engagement when the hook is in said other position.

References Cited in the file of this patent
UNITED STATES PATENTS

| | | |
|---|---|---|
| 2,149,262 | Ahler | Mar. 7, 1939 |
| 2,553,830 | Motis | May 22, 1951 |
| 2,637,042 | Threewit | May 5, 1953 |